United States Patent
Zank

(10) Patent No.: US 9,262,004 B2
(45) Date of Patent: Feb. 16, 2016

(54) OVERLAY FOR ELECTRONIC WRITING PAD

(71) Applicant: Topaz Systems, Inc., Simi Valley, CA (US)

(72) Inventor: Anthony E. Zank, Westlake Village, CA (US)

(73) Assignee: Topaz Systems, Inc., Simi Valley, CA (US)

( * ) Notice: Subject to any disclaimer, the term of this patent is extended or adjusted under 35 U.S.C. 154(b) by 17 days.

(21) Appl. No.: 14/175,700

(22) Filed: Feb. 7, 2014

(65) Prior Publication Data

US 2015/0227251 A1 Aug. 13, 2015

(51) Int. Cl.
*G06F 3/041* (2006.01)
*G02F 1/1333* (2006.01)
*G06F 1/16* (2006.01)

(52) U.S. Cl.
CPC .......... *G06F 3/0414* (2013.01); *G02F 1/13338* (2013.01); *G06F 1/1603* (2013.01)

(58) Field of Classification Search
CPC ..... G06F 3/045; G06F 3/0414; G06F 1/1603; G02F 1/13338
USPC ............. 345/104, 173–179; 178/18.01–18.07
See application file for complete search history.

(56) References Cited

U.S. PATENT DOCUMENTS

| | | | | |
|---|---|---|---|---|
| 5,548,417 | A * | 8/1996 | Sekimoto | H04N 1/00352 358/474 |
| 6,537,711 | B1 * | 3/2003 | Nimura et al. | 430/20 |
| 8,508,790 | B2 * | 8/2013 | Hirose et al. | 358/1.3 |
| 2002/0118400 | A1 * | 8/2002 | Koshimizu et al. | 358/472 |
| 2007/0164927 | A1 * | 7/2007 | Shoya et al. | 345/30 |
| 2007/0171462 | A1 * | 7/2007 | Shoya et al. | 358/1.15 |
| 2007/0268319 | A1 * | 11/2007 | Tatewaki et al. | 347/1 |
| 2010/0156859 | A1 * | 6/2010 | Sakurai et al. | 345/204 |
| 2010/0265214 | A1 * | 10/2010 | Green et al. | 345/174 |
| 2012/0268420 | A1 * | 10/2012 | Marhefka et al. | 345/174 |
| 2013/0107144 | A1 * | 5/2013 | Marhefka et al. | 349/12 |
| 2015/0022460 | A1 * | 1/2015 | Kelso | G06F 3/04883 345/173 |

* cited by examiner

*Primary Examiner* — Lun-Yi Lao
*Assistant Examiner* — Kelly B Hegarty
(74) *Attorney, Agent, or Firm* — Denton L. Anderson; Leech Tishman Fuscaldo & Lampl

(57) ABSTRACT

An overlay for covering the writing surface of an electronic writing tablet includes (a) an LCD touch screen adapted to (i) initially display an image drawn or written upon the upper surface by application of pressure on the upper surface without requiring a transfer of matter to the upper surface and (ii) continue display of the image without the consumption of electrical power; (b) a source of electrical power; and (c) a reversible attaching mechanism for reversibly attaching the LCD touch screen over the writing surface of the writing tablet.

11 Claims, 1 Drawing Sheet

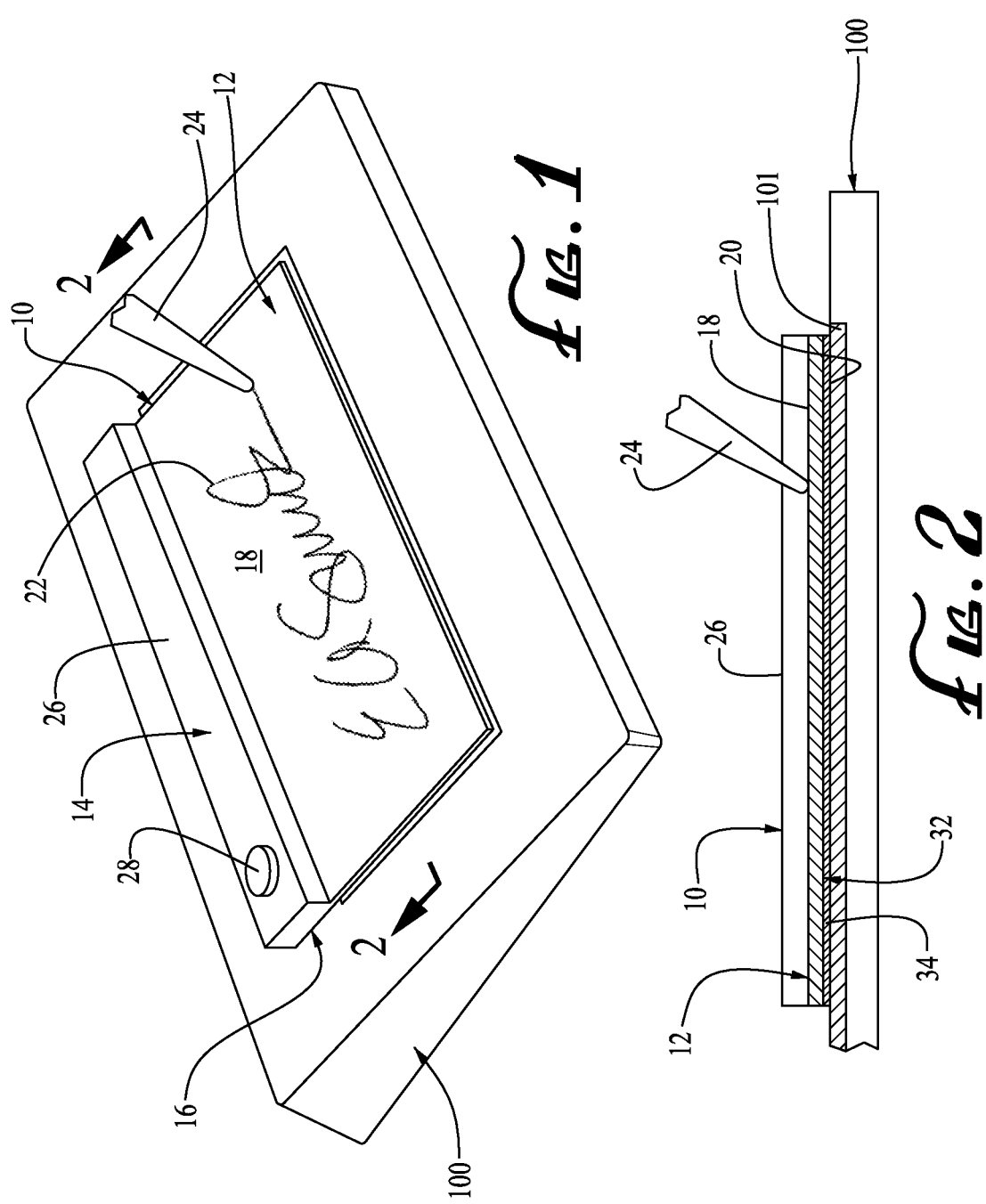

OVERLAY FOR ELECTRONIC WRITING PAD

FIELD OF THE INVENTION

This invention relates generally to electronic writing tablets, and, more specifically, to overlays for electronic writing tablets.

BACKGROUND OF THE INVENTION

Electronic writing tablets have become very common, especially those adapted for use as signature tablets. A problem arises with the use of such electronic writing tablets because their writing surfaces are vulnerable to being scratched, accidentally written on by an inking pen, or otherwise damaged, and the cost of replacing such writing surfaces can be a significant factor in the overall life-cycle cost of the product.

Attempts have been made to protect the writing surface of an electronic writing tablet with a transparent overlay. Unfortunately however, such transparent overlay tends to mask the image that is shown on the surface beneath the protective overlay, or on an underlaid pixel-driven LCD display that corresponds to the writing on the writing surface, making it difficult to read. This is especially true with the passage of time. In addition, underlaid pixel-driven LCD displays which show the written image inherently display a lower-resolution than the actual writing and can exhibit mis-registration between the pen tip and the displayed ink dots, thus making the use of the product less like true ink-on-paper.

Accordingly, there is a need for a device which protects the writing surfaces of an electronic writing tablet without masking the written image, while at the same time providing a higher resolution image of the writing and providing excellent pen to image registration.

SUMMARY OF THE INVENTION

The invention satisfies this need. The invention is an overlay for covering the writing surface of an electronic writing tablet. The overlay comprises (a) an LCD touch screen having an upper surface and a lower surface, the LCD touch screen being adapted to (i) initially display an image drawn or written upon the upper surface by application of pressure on the upper surface without requiring a transfer of matter to the upper surface and (ii) continue display of the image without the consumption of electrical power; (b) a source of electrical power for powering the LCD touch screen; and (c) a reversible attaching mechanism for reversibly attaching the LCD touch screen over the writing surface of the writing tablet.

DRAWINGS

These and other features, aspects and advantages of the present invention will become better understood with reference to the following description, appended claims, and accompanying drawings where:

FIG. 1 is a perspective view of an overlay for an electronic writing tablet having features of the invention; and FIG. 2 is a cross-sectional view of the overlay illustrated in FIG. 1, taken along line 2-2.

DETAILED DESCRIPTION OF THE INVENTION

The following discussion describes in detail one embodiment of the invention and several variations of that embodiment. This discussion should not be construed, however, as limiting the invention to those particular embodiments. Practitioners skilled in the art will recognize numerous other embodiments as well.

DEFINITIONS

As used herein, the following terms and variations thereof have the meanings given below, unless a different meaning is clearly intended by the context in which such term is used.

The terms "a," "an," and "the" and similar referents used herein are to be construed to cover both the singular and the plural unless their usage in context indicates otherwise.

As used in this disclosure, the term "comprise" and variations of the term, such as "comprising" and "comprises," are not intended to exclude other additives, components, integers, ingredients or steps.

The Invention

The invention is an overlay 10 for covering the writing surface of an electronic writing tablet 100. The overlay 10 comprises an LCD touch screen 12, a source of electrical power 14 and a reversible attaching mechanism 16 for reversibly attaching the LCD touch screen 12 over the writing surface 101 of the writing tablet 100.

The electronic writing tablet 100 can be an x-y touch surface, but can also be some other types of electronic writing pads (i.e. electromagnetic with stylus).

The LCD touch screen 12 has an upper surface 18 and a lower surface 20 and is adapted to (i) initially display an image 22 drawn or written upon the upper surface 18 by application of pressure on the upper surface 18 without requiring a transfer of matter to the upper surface 18 and (ii) continue display of the image 22 without the consumption of electrical power.

The LCD touch screen 12 is a bistable liquid crystal display (BLCD), preferably, a cholesteric liquid crystal display (ChLCD). Several embodiments of the LCD touch screen 12 are disclosed in U.S. Pat. Pub. No. 2012/0268,420 (U.S. patent application Ser. No. 13/458,223), entitled "Writing Tablet Information Recording Device," filed Apr. 27, 2012, the entirety of which is incorporated herein by reference.

The LCD touch screen 12 is a pressure-activated touch screen which detects the presence of a writing implement, such as a stylus 24. When a stylus 24 applies pressure on the upper surface 18 of the touch screen 12, the touch screen 12 detects the pressure and displays an image 22. The stylus 24 can be passive, or it can be powered using an internal battery. It can be powered wirelessly or via an electrical cable from the electronic writing tablet (100) itself.

Depending on how much pressure the user presses the tip of the stylus 24 into the touch screen 12, a wider or narrower width line can be detected and displayed. This is a function of the amount of LCD material displaced within the LCD touch screen with drawing on its surface. The version of the image sensed by the electronic writing tablet 100 is detected independently of the image 22 on the touch screen 12. However, when properly balanced, the two both capture very similar or identical images.

In some embodiments, the stylus 24 of touchscreen 12 can be detected even when it does not quite touch the upper surface 18, in which case stylus 24 movements might be electronically captured but nothing drawn on the pressure display. By pressing the stylus 24 harder (deeper) into the upper surface 18, a thicker line can be both drawn on the writing surface of the writing tablet 100 and a thicker line can also be detected by the touch screen 12.

Generally it requires only nominal power to maintain a stable image 22 on the touch screen 12 due to the bistable nature of the liquid crystal utilized for the device 10. This leads to a long life for the LCD touch screen assembly without requiring a separate power source, or power from the electronic writing pad itself.

Typically, the source of electrical power for the touch screen 12 is separate from any source of electrical power for powering the writing tablet 100. The source of electrical power is typically self-contained with its own battery or other source of power disposed in a battery compartment 26.

The reversible attaching mechanism 16 reversibly attaches the LCD touch screen 12 over the writing surface 101 of the electronic tablet 100. This can be accomplished using bolts and nuts, clips, clamps, pins, tongue and groove, etc. In the embodiment illustrated in the drawings, the reversible attaching mechanism 14 can be provided by a low tack adhesive. Many other reversible attaching mechanisms 14 can alternatively be used. In all cases, the reversible attaching mechanism 16 provides the user with the ability to quickly and easily replace a worn or damaged touch screen 12 with a new touch screen 12, typically using only common hand tools or no tools at all.

An image 22 on the touch screen 12 can be erased by applying voltage pulses. Thus, by pushing an ERASE button 28 the image 22 on the touch pad 12 can be extinguished. Alternatively, the image 22 can be automatically erased. This can be accomplished by incorporating within the device a circuit, and act of writing sensor within the device. The act of signing/not signing is detected by a pressure sensor that is located on the unit, for example, on the back of the touch screen, or by sensing voltage, current, or impedance variations within the LCD touch screen directly 12.

In one embodiment, the overlay of the invention 10 further comprises an auto-erase mechanism 32 pressure sensing layer 34. The pressure sensing layer 34 can be disposed contiguous with the lower surface 20 of the touch screen 12, for example, laminated to the lower surface 20, or it can be integrated with the touch screen 12. The pressure sensing layer 34 is not connected by circuitry to the writing tablet 100. The auto-erase mechanism 32 is capable of directly sensing pressure applied to the upper surface 18 of the touch screen 12 and is adapted to erase an image 22 displayed on the touch screen 12 after the passage of a predetermined period of time when the pressure sensing layer 34 directly senses no pressure applied to the upper surface 18 of the touch screen 12.

In another embodiment, the overlay of the invention 10 further comprises the auto-erase mechanism 32 having a pressure sensing function contained within the touch screen 12. For example, the auto-erase function can be controlled by sensing applied stylus pressure from within the touch screen 12 by sensing pressure applied to the upper surface 18 of the touch screen 12—directly from the electrodes that power the structure—by monitoring resistance, capacitance, voltage or current levels or changes in those levels. Also, because the touch screen 12 consumes power when it is being written upon, the monitoring of that small amount of power consumption can provide an indication of writing pressure. Other means that can be used to detect the act of writing include optical, capacitive or other means of sensing the stylus or the hand of the signer in direct proximity to the signing surface.

Like in the embodiment described immediately above, the pressure sensing function is capable of directly sensing pressure applied to the upper surface 18 of the touch screen 12 and is not connected by circuitry to the writing tablet 100. Also as in the embodiment described immediately above, the auto-erase mechanism 32 is capable of directly sensing pressure applied to the upper surface 18 of the touch screen 12 and is adapted to erase an image 22 displayed on the touch screen 12 after the passage of a predetermined period of time when there is sensed to no pressure applied to the upper surface 18 of the LCD touch screen 12.

The auto-erase feature can also be triggered by sensing the removal of the writer's hand or the stylus 24 using means known in the state of the art, such as optical and capacitive proximity sensors contained within the touch screen 12.

The invention 10 provides a convenient replaceable screen protector for protecting the writing surface 101 of an electronic writing tablet 100. The invention 10 can also be used to turn an existing non-LCD digitizer into an LCD digitizer without having to modify the electronic writing tablet.

Having thus described the invention, it should be apparent that numerous structural modifications and adaptations may be resorted to without departing from the scope and fair meaning of the instant invention as set forth herein above and described herein below by the claims.

What is claimed is:

1. An overlay for covering the writing surface of an electronic writing tablet, the overlay comprising:
   a) an LCD touch screen having an upper surface and a lower surface, the LCD touch screen being adapted to (i) initially display an image drawn or written upon the upper surface by application of pressure on the upper surface without requiring a transfer of matter to the upper surface and (ii) continue display of the image without the consumption of electrical power;
   b) a source of electrical power for powering the LCD touch screen;
   c) a reversible attaching mechanism for reversibly attaching the LCD touch screen over the writing surface of the writing tablet; and
   d) an auto-erase mechanism capable of directly sensing pressure applied to the upper surface of the LCD touch screen and adapted to erase an image displayed on the LCD touch screen after the passage of a predetermined period of time when a pressure sensing layer directly senses no pressure applied to the upper surface of the LCD touch screen.

2. The overlay of claim 1 wherein the source of electrical power for powering the LCD touch screen is separate from any source of electrical power for powering the writing tablet.

3. The overlay of claim 1 further comprising (a) a pressure sensing layer disposed contiguous with the lower surface of the LCD touch screen and not connected by circuitry to the writing tablet and (b) an auto-erase mechanism capable of directly sensing pressure applied to the upper surface of the LCD touch screen and adapted to erase an image displayed on the LCD touch screen after the passage of a predetermined period of time when the pressure sensing layer directly senses no pressure applied to the upper surface of the LCD touch screen.

4. The overlay of claim 1 further comprising (a) a pressure sensing function contained within the LCD touch screen and not connected by circuitry to the writing tablet and (b) an auto-erase mechanism capable of directly sensing pressure applied to the upper surface of the LCD touch screen and adapted to erase an image displayed on the LCD touch screen after the passage of a predetermined period of time when the pressure sensing layer directly senses no pressure applied to the upper surface of the LCD touch screen.

5. An electronic writing tablet comprising:
   a) a writing surface; and
   b) an overlay reversibly attached over the writing surface, the overlay comprising:

i) an LCD touch screen having an upper surface and a lower surface, the LCD touch screen being adapted to (I) initially display an image drawn or written upon the upper surface by application of pressure on the upper surface without requiring a transfer of matter to the upper surface and (II) continue display of the image without the consumption of electrical power;

ii) a source of electrical power for powering the LCD touch screen;

iii) a reversible attaching mechanism for reversibly attaching the LCD touch screen disposed over the writing surface of the writing tablet; and iv) an auto-erase mechanism capable of directly sensing pressure applied to the upper surface of the LCD touch screen and adapted to erase an image displayed on the LCD touch screen after the passage of a predetermined period of time when a pressure sensing layer directly senses no pressure applied to the upper surface of the LCD touch screen.

6. The electronic writing tablet of claim 5 wherein the source of electrical power for powering the LCD touch screen is separate from any source of electrical power for powering the writing tablet.

7. The electronic writing tablet of claim 5 wherein the overlay further comprises (a) a pressure sensing layer disposed contiguous with the lower surface of the LCD touch screen and not connected by circuitry to the writing tablet and (b) an auto-erase mechanism capable of directly sensing pressure applied to the upper surface of the LCD touch screen and adapted to erase an image displayed on the LCD touch screen after the passage of a predetermined period of time when the pressure sensing layer directly senses no pressure applied to the upper surface of the LCD touch screen.

8. The electronic writing tablet of claim 5 wherein the overlay further comprises (a) a pressure sensing function contained within the LCD touch screen and not connected by circuitry to the writing tablet and (b) an auto-erase mechanism capable of directly sensing pressure applied to the upper surface of the LCD touch screen and adapted to erase an image displayed on the LCD touch screen after the passage of a predetermined period of time when the pressure sensing function directly senses no pressure applied to the upper surface of the LCD touch screen.

9. The electronic writing tablet of claim 5 wherein the overlay further comprises (a) a proximity sensing function contained within the LCD touch screen for sensing the proximity of the user's hand or stylus, the proximity sensing function not being connected by circuitry to the writing tablet and (b) an auto-erase mechanism capable of automatically erasing an image on the LCD touch after the passage of a predetermined period of time when the proximity sensing function senses no proximity of a user's hand or stylus to the upper surface of the LCD touch screen.

10. A method of protecting the writing surface of an electronic writing tablet comprising the steps of:

a) providing a first overlay having:

i) an LCD touch screen having an upper surface and a lower surface, the LCD touch screen being adapted to (I) initially display an image drawn or written upon the upper surface by application of pressure on the upper surface without requiring a transfer of matter to the upper surface and (II) continue display of the image without the consumption of electrical power;

ii) a source of electrical power for powering the LCD touch screen;

iii) a reversible attaching mechanism for reversibly attaching the LCD touch screen over the x-y touch surface of the writing tablet; and iv) an auto-erase mechanism capable of directly sensing pressure applied to the upper surface of the LCD touch screen and adapted to erase an image displayed on the LCD touch screen after the passage of a predetermined period of time when a pressure sensing layer directly senses no pressure applied to the upper surface of the LCD touch screen; and b) attaching the first overlay over the writing surface of the electronic writing tablet with the reversible attaching mechanism of the first overlay.

11. The method of claim 10 comprising the additional steps of:

c) providing a second overlay having:

i) an LCD touch screen having an upper surface and a lower surface, the LCD touch screen being adapted to (I) initially display an image drawn or written upon the upper surface by application of pressure on the upper surface without requiring a transfer of matter to the upper surface and (II) continue display of the image without the consumption of electrical power;

ii) a source of electrical power for powering the LCD touch screen; and iii) a reversible attaching mechanism for reversibly attaching the LCD touch screen over the writing surface of the writing tablet;

d) removing the first overlay with the reversible attaching mechanism of the first overlay; and e) attaching the second overlay over the writing surface of the electronic writing tablet with the reversible attaching mechanism of the second overlay.

\* \* \* \* \*